(12) United States Patent
Geerlings

(10) Patent No.: US 11,074,150 B2
(45) Date of Patent: Jul. 27, 2021

(54) CHIP HEALTH MONITOR

(71) Applicant: NXP B.V., Eindhoven (NL)

(72) Inventor: Jurgen Geerlings, Eindhoven (NL)

(73) Assignee: NXP B.V., San Jose, CA (US)

( * ) Notice: Subject to any disclaimer, the term of this patent is extended or adjusted under 35 U.S.C. 154(b) by 217 days.

(21) Appl. No.: 16/389,049

(22) Filed: Apr. 19, 2019

(65) Prior Publication Data

US 2020/0334118 A1 Oct. 22, 2020

(51) Int. Cl.

| | | |
|---|---|---|
| *G06F 11/00* | (2006.01) | |
| *G06F 11/26* | (2006.01) | |
| *G06F 30/30* | (2020.01) | |
| *G01R 31/319* | (2006.01) | |
| *G06F 119/12* | (2020.01) | |
| *G05F 3/02* | (2006.01) | |

(52) U.S. Cl.
CPC ........ *G06F 11/26* (2013.01); *G01R 31/31903* (2013.01); *G06F 30/30* (2020.01); *G05F 3/02* (2013.01); *G06F 2119/12* (2020.01)

(58) Field of Classification Search
CPC ...................................................... G06F 11/26
See application file for complete search history.

(56) References Cited

U.S. PATENT DOCUMENTS

| | | | |
|---|---|---|---|
| 7,653,850 B2 | 1/2010 | Tschanz et al. | |
| 8,860,502 B2 | 10/2014 | Gemmeke et al. | |
| 9,483,068 B2 | 11/2016 | Raja et al. | |
| 2007/0164787 A1 | 7/2007 | Grochowski et al. | |
| 2009/0044160 A1 | 2/2009 | Bueti et al. | |
| 2009/0115468 A1 | 5/2009 | Berthold et al. | |
| 2011/0302460 A1 | 12/2011 | Idgunji et al. | |
| 2012/0158339 A1 | 6/2012 | Chawla et al. | |
| 2013/0226496 A1* | 8/2013 | Gudem | H04B 17/21 |
| | | | 702/107 |
| 2016/0179186 A1 | 6/2016 | Toh et al. | |
| 2017/0076032 A1* | 3/2017 | Yeric | G06F 30/398 |
| 2019/0229956 A1* | 7/2019 | Poulton | H04L 25/0288 |

OTHER PUBLICATIONS

Kerkhoff, Hans G. et al., "Linking Aging Measurements of Health-Monitors and Specifications for Multi-Processor SoCs", 2014 9th International Conference on Design & Technology of Integrated Systems in Nanoscale Era (DTIS), May 6, 2014, pp. 1-6, IEEE, Piscataway, NJ, USA.

Wang, Jinn-Shyan et al., "Process/Voltage/Temperature-Variation-Aware Design and Comparative Study of Transition-Detector-Based Error-Detecting Latches for Timing-Error-Resilient Pipelined Systems", IEEE Transactions on Very Large Scale Integration (VLSI) Systems, Oct. 1, 2017, pp. 2893-2906, vol. 25, No. 10, IEEE, Piscataway, NJ, USA.

* cited by examiner

*Primary Examiner* — Katherine Lin (57) ABSTRACT

A chip health monitor includes a processor configured to operate as a state machine based on instructions stored in a storage device. The state machine is configured to exercise a signal path in a chip in response to a condition and determine presence of an error in the signal path based on results from the exercise. The state machine is configured to compensate for the error by changing at least one operational parameter of the chip.

17 Claims, 4 Drawing Sheets

CHIP HEALTH MONITOR

TECHNICAL FIELD

Example embodiments disclosed herein relate generally to controlling electronic circuits.

BACKGROUND

The performance of an integrated circuit may be adversely affected by process variations, aging, and fluctuations in temperature, voltage, or current. These effects may cause the maximum operating frequency of the integrated circuit to deviate from an intended range. In other cases, the chip may experience timing problems or one or more of its functional units may fail. As a consequence, the operation of a host system including the integrated circuit may be rendered unsuitable for its intended purpose.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

Example embodiments include a chip health monitor includes a storage device configured to store instructions and a processor configured to operate as a state machine based on the stored instructions, wherein the state machine is configured to exercise a path in a chip in response to a condition and determine presence of an error in the path based on results from the exercise, and wherein the state machine is configured to compensate for the error by changing at least one operational parameter of the chip. The state machine may change an operation or parameter for exercising the path when the instructions stored in the storage device change. This change may occur, for example, when the type of testing, sensing, or error detection is to be changed.

The condition may include detection of one or more anomalies in data values output from one or more functional blocks of the chip, or another error condition. The condition may include at least one of detection of an idle time of a central processing unit of the chip or a periodic timing. The error may be one of a timing problem, a maximum operating frequency outside of a predetermined range, a supply voltage or current deviating from a predetermined voltage or current, a delay on a signal path, or an error producing by aging effects of the chip. The path may be configured to transfer the instructions from the storage device to the processor. The path may be an internal signal path of the processor, and the state machine may be configured to exercise the internal signal path based on an instruction transferred from the storage device to the processor. In one case, the state machine may generate signals to exercise at least one signal path outside of the chip. The at least one operational parameter of the chip may include maximum operating frequency of the chip, an operating frequency of a functional unit on the chip, a supply voltage of the chip, or a forward body bias of the chip. The storage device and the processor may be on the chip.

In accordance with one or more embodiments, a method for monitoring the health of a chip includes detecting a condition, configuring a processor to operate as a state machine for exercising a path in the chip, the processor configured to operate as the state machine based on stored instructions, determining presence of an error based on results obtained from the state machine exercising the path, and compensating for the error by changing at least one operational parameter of the chip. The method may include changing the stored instructions to change operation or a parameter of the state machine for exercising the path. In one embodiment, the signal path may be in an external device when, for example, the state machine has sufficient control and way of observing the external device.

The condition may include detection of an operating parameter or condition of the chip. The error may include one of a timing problem, a maximum operating frequency outside of a predetermined range, a supply voltage or current deviating from a predetermined voltage or current, a delay on a signal path, or an error producing by aging effects of the chip. The path may be configured to transfer the instructions from the storage device to the processor. The path may be an internal signal path of the processor, and the state machine may be configured to exercise the internal signal path based on an instruction transferred from the storage device to the processor. In one case, signals may be generated to exercise at least one signal path outside of the chip.

In accordance with one or more embodiments, a non-transitory machine-readable medium storing instructions for causing a processor to perform operations including detecting a condition, configuring a processor to operate as a state machine for exercising a path in the chip, the processor configured to operate as the state machine based on stored instructions, determining presence of an error based on results obtained from the state machine exercising the path, and compensating for the error by changing at least one operational parameter of the chip. The instructions may cause the processor to change the stored instructions to change operation or a parameter of the state machine for exercising the path.

The error may be one of a timing problem, a maximum operating frequency outside of a predetermined range, a supply voltage or current deviating from a predetermined voltage or current, a delay on a signal path, or an error producing by aging effects of the chip. The path may be an internal signal path of the processor, and the state machine may be configured to exercise the internal signal path based on an instruction transferred from the storage device to the processor. In one embodiment, the internal path may be in another unit of the chip, e.g., a functional unit or a memory instance.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

In chip design, maximum operating frequency is one of the main design criteria. This frequency may be adversely affected by a variety of phenomena. Attempts have been made to address this problem. One attempt involves over-designing the parameters of the chip to satisfy worst case process corners. Another attempt involves adding process monitors, replica paths, or physical sensors to measure degradation of the chip. These attempts are costly and inefficient.

Figure 1:
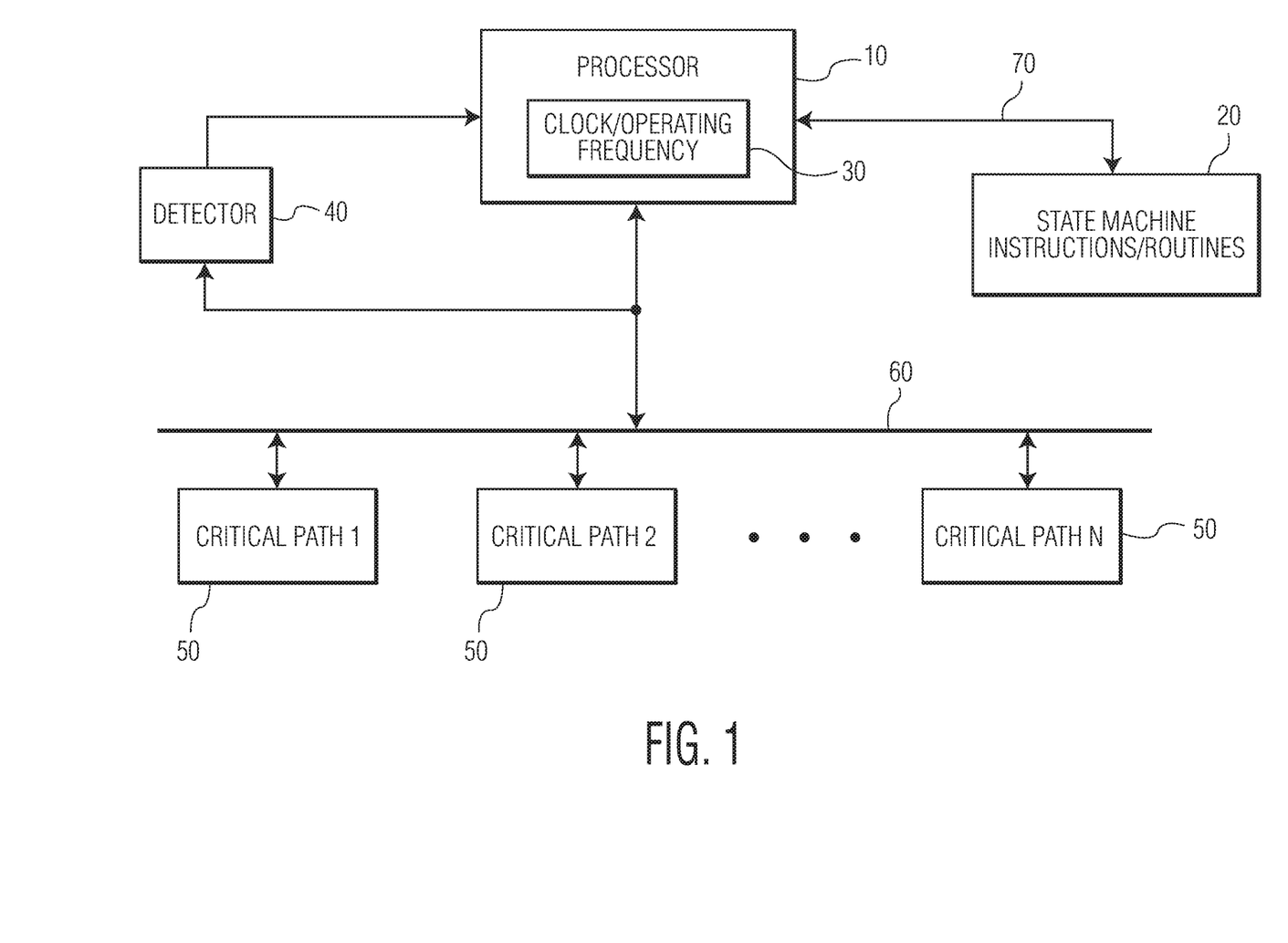
FIG. 1 illustrates an embodiment of a health monitor.

FIG. 1 illustrates an embodiment of a health monitor for an integrated circuit chip. The health monitor includes a processor 10, a storage device 20, system clock 30, and a detector 40. The processor 10 may be a central processing unit (CPU), a digital signal processor (DSP), a graphics processing unit (GPU), or another type of processor located on or off the chip being monitored. In one embodiment, the processor 10 is configured as a programmable state machine for exercising one or more signal paths 50 of the chip. Exercising a signal path in the chip may include, for example, sending one or more test signals through the signal path, adjusting one or more parameters associated with the signal path (e.g., adjusting a parameter of a functional unit along the signal path), or invoking one or more operations or circuits in the chip.

The storage device 20 may store routines and/or instructions (generally referred to as instructions) for programming the processor 10 to operate as a state machine. The instructions may configure the state machine to exercise one signal path in the chip or multiple signal paths. For example, the state machine may run one or more tests for the signal path(s) to determine whether the chip and/or one of its internal circuits or functional units is experiencing a performance or operational error. The error may be caused, for example, by process variations, fluctuations in temperature or voltage, and/or aging effects (PVTA). The storage device may be, for example, any one of a variety of types of memory.

Because the processor 10 is configured as a state machine based on the instructions in the storage device 20, the operations performed by the state machine may easily be changed simply by changing the instructions in the storage device 20. This is in contrast to other circuit monitoring systems which are implemented in specially dedicated chips whose functionality is fixed as a result of their hardware design. However, a state machine configured in accordance with one or more of the embodiments described herein may easily be changed by updating or replacing the instructions. For example, the instructions may be updated, changed, or replaced in order to change the manner in which a signal path is exercised, change the signal path to be exercised, to add or subtract signal path testing when multiple paths are to be tested, change the condition(s) under which a signal path is to be exercised, change parameters used in exercising signal paths, and/or change the method to compensate or correct present or anticipated errors detected by exercising the paths.

The system clock 30 may control one or more operating frequencies of the chip, including a maximum operational frequency that may directly or indirectly affect the entire operation of the chip. For example, the system clock 30 may output timing signals to control one or more circuits disposed along the signal paths of the chip being monitored. In one embodiment, the system clock 30 may provide different timing signals or operating frequencies to different domains or functional units of the chip, and/or to support different operational modes including low-power modes.

The detector 40 may detect signals output from one or more of the signal paths being tested. In accordance with one or more embodiments, the detector 40 may detect signals generated process variations and/or temperature, voltage, and/or current fluctuations on the chip. The detector may also detect certain conditions or performance parameters produced by aging effects, voltage drops, timing problems, signal delays (e.g., delay variations of logical gates), and/or other anomalies that may take place in the chip. In some types of chips, all or a portion of these effects may reduce or otherwise affect the maximum operating frequency of the chip or may produce other unwanted effects. Based on the instructions used to program the state machine, the processor 10 may identify the errors based on the detected signals. In one embodiment, the operation(s) performed by detector 40 may be performed by the processor 10 in order to reduce chip space and costs.

In these or other embodiments, the processor 10 may compare the detected signals to one or more expected results stored in the memory or storage device. The expected results may include values, parameters, waveforms, or other information that should be produced in the chip circuits (e.g., as determined by design specifications) when operating in an intended manner. Deviation of the detected signals from the expected results may serve as a basis for identifying a specific type of error in the chip. In one particular example, anomalies in data values may be compared for purposes of identifying one or more types of errors. In one embodiment, error detection may be performed based on detection of a voltage or current that lies outside of a predetermined range when a signal path is exercised. This deviation may be detected to determine a specific type of error in the chip and/or in one of its internal circuits or functional units. In another example, the detector 40 may detect a change in temperature, process variation, timing problem, or another anomaly that may trigger testing one or more signal paths.

In some embodiments, the state machine may exercise (or test) one or more signal paths periodically or according to a predetermined schedule. In these or other embodiments, the state machine (e.g., processor 10) may test the signal path(s) during an idle time of the processor 10. If the processor 10 is different from a system CPU, then the state machine may test the signal path(s) during an idle time of the CPU in order to minimize impact on system performance. (In at least one embodiment, the term "system" may mean the chip or a host system which includes the chip).

In these or other embodiments, the state machine may test one or more signal paths with a lower priority than other tasks. The state machine may also test one or more signal paths when system degradation is anticipated, e.g., when the temperature changes by a predetermined or significant amount or when there is a reduction in supply voltage. In this case, the detector 30 may include sensor(s) to measure temperature and/or the voltage level along one or more signal paths in the chip.

By performing these monitoring functions, the state machine may detect errors (or other conditions in the chip) that may adversely affect performance, e.g., that causes a reduction in maximum operating frequency, supply voltage, or other performance parameter.

Once an error is determined to exist in a signal path, the state machine may generate one or more signals to correct or otherwise compensate for the errors. The state machine may be programmed to perform various compensation operations depending, for example, on the type of error detected. For example, when the maximum operating frequency of the chip is determined to be (e.g., below) an intended range, the state machine may generate a control signal to perform a voltage scaling operation (e.g., voltage upscaling) and/or a forward body biasing operation in order to mitigate the error. In these or other embodiments, the state machine 10 may generate a control signal to increase a supply voltage of the chip or change a frequency of the system clock 30. In some cases (e.g., depending on the type of error), the processor 10 may reduce the maximum operating frequency of the chip, e.g., by changing the frequency of the system clock, operating speed of the chip or one of its circuits, and/or by performing other operations. In some embodiments, multiple compensating techniques may be implemented to correct or otherwise mitigate a detected error.

In one embodiment, the state machine may measure a margin until an error occurs. This may be accomplished, for example, by increasing the system clock speed during execution of the instructions corresponding to the routine(s) driving the state machine, which, for example, may be referred to as health monitor routines. In another embodiment, the state machine may measure the voltage margin by changing (e.g., reducing) the operating voltage of the chip and performing a comparison to expected results. When errors are detected, the state machine may also output an alert or warning signal (for example, to the host system) indicating that a failure is imminent and/or the chip may experience an error or failure sometime in the near future.

The processor 10 may be implemented as a microcontroller (e.g., Micro Computer Unit) which includes a CPU that executes instructions stored in the memory 20, which, for example, may be a read only memory (ROM), static random-access memory (SRAM), or an external (e.g., off-chip) memory. Like in the previous embodiments, the CPU is programmed as a state machine based on the instructions in memory 20 for exercising signal paths in the chip to determine errors.

One of the signal paths 70 that may be exercised is the signal path used by the processor 10 (or CPU) to fetch instructions from a memory, which may be memory 20 or a different memory on or off the chip. The health (e.g., existence of errors on this path) may be determined by the state machine based on signals detected when the path is exercised. Other signal paths (Critical Path 1, Critical Path 2, . . . , Critical Path N) 50 may communicate with each other, the state machine, and/or other circuits on the chip through an internal bus 60. Use of the term "critical" in association with the term "path" does not mean that the path is necessarily more important than any other signal path, but rather is used herein merely to indicate that the path may be one that is to be exercised in accordance with one or more embodiments.

In addition to exercising the path used to fetch instructions, the instruction (e.g., an arithmetic instruction) themselves may exercise signal paths inside the CPU or outside the CPU, e.g., load or store instructions. The load and store instructions to an IP block may trigger data paths inside a functional unit or block. Thus, by executing certain defined instructions, routines may be generated that convert the CPU 10 into a state machine for monitoring the performance ("health") of the chip and compensating for any detected errors.

As previously described, these routines can exercise (or test) a given data path. The result of this routine may be observed, for example, as a change in a signal or data value stored in a register. The CPU can read this register or observe this signal (e.g., in one embodiment the processor 10 may perform the function of the detector 30) and compare the result with an expected value. The expected value may, for example, be based on an analysis performed offline, e.g., in a verification environment. When the data stored in the register or the observed signal do not match the expected value, the state machine implemented by the CPU 10 may determine that an error has occurred somewhere in the data path. The error may be, for example, a timing error or another type of error.

In one embodiment, a check may be performed to validate detection of an error. For example, in one embodiment the CPU 10 may operate the same path which produced an error at a different (e.g., lower) frequency. If no errors are detected at this different frequency, this may serve as validation that the path includes an error at the frequency used to test the path. In one embodiment, the state machine may be implemented to differentiate between instruction fetch errors and data path errors. In this case, the instruction fetches may be performed at a different speed or frequency than used to test the data path errors, e.g., the instruction fetches may be performed at a lower than nominal speed, for example, by inserting one or more wait states during instruction memory reads. While the processor 10 has been described to include a CPU or MCU, in another embodiments the processor 10 may implement as state machine based on a very long instruction word (VLIW) architecture, an instruction set of a graphics processor unit, or a digital signal processing unit.

Figure 2:
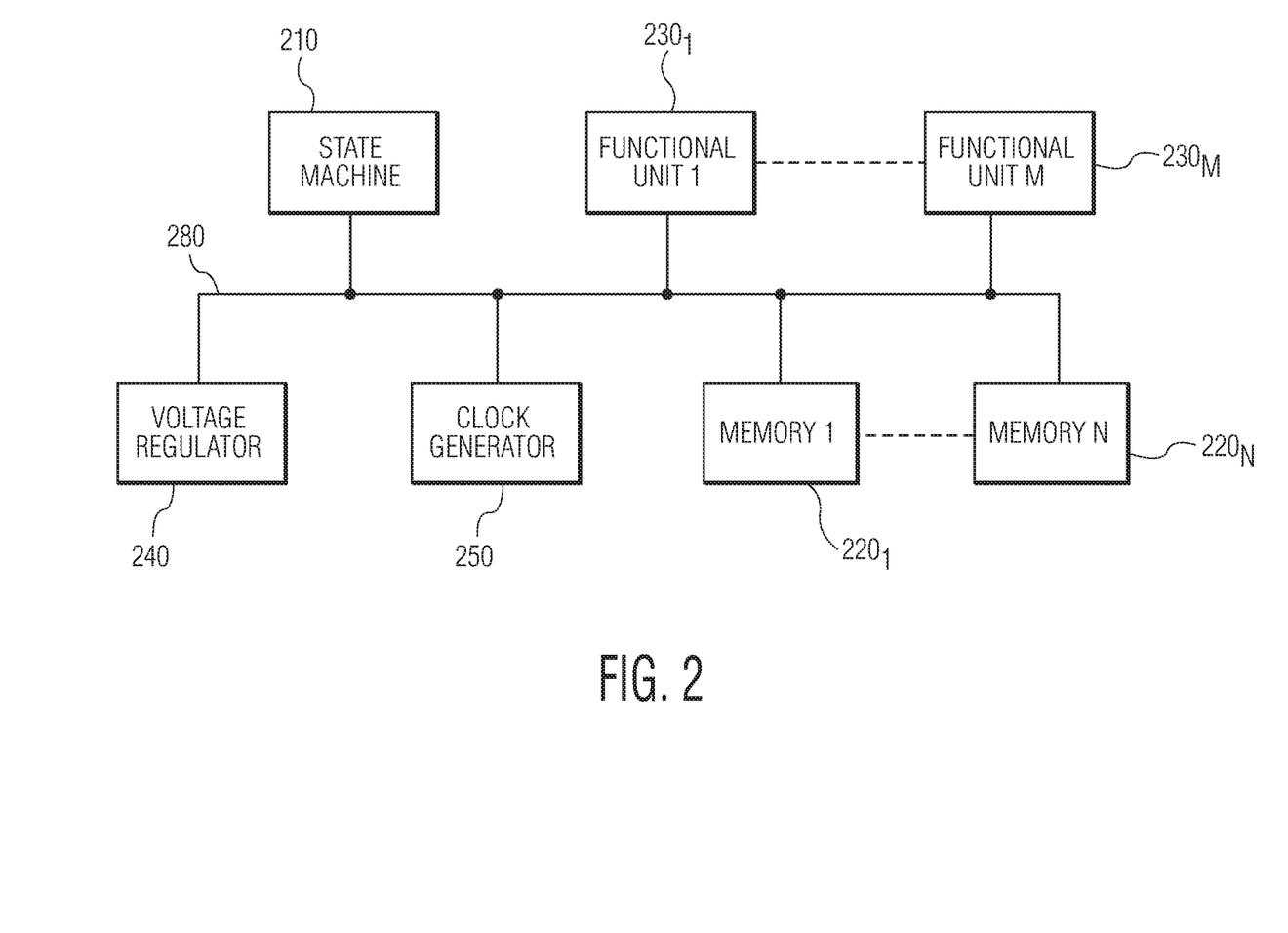
FIG. 2 illustrates another embodiment of a health monitor.

FIG. 2 illustrates an embodiment of a monitoring system which includes a state machine 210 that communications with a plurality of memories $220_1$ to $220_N$ through a bus 280. The state machine is programmed based on instructions stored, for example, in one of the memories 220. As previously indicated, the state machine may be implemented by a processor such as but not limited to a CPU, DSP, VLIW, etc. In this embodiment, the state machine 210 may read and write data from/to one or more of the memories.

The state machine 210 may also communicate with one or more functional units $230_1$ to $230_M$ through bus 280 or through a different bus or signal path. In one embodiment, the state machine may read or write data from/to one or more of the functional units $230_1$ to $230_M$. When, for example, the supply voltage of one of the functional units is outside a predetermined range (e.g., too low relative to a reference voltage) and/or the operating frequency of the functional units is outside a predetermined range (e.g., too high relative to a reference frequency), the functional unit(s) may experience timing problems and thus operate in an erratic or unintended manner.

The state machine 210 may be programmed (based on one or more instructions stored in memory) to compensate for the timing problems. For example, when the state machine 210 is implemented by a CPU, the CPU may execute instructions to test one of the functional units and determined whether it exhibits expected results or behavior. When the functional unit generated results different from the expected results, the CPU may determine that the functional unit is experiencing a timing problem. In one embodiment, the timing problem may be confirmed by observing that the functional unit produces expected results (or that an error otherwise does not exist) when, for example, the operating frequency of the functional unit is changed (e.g., lowered) or the supply voltage of the functional unit is changed (e.g., increased) by the state machine 210. In one embodiment, a timing problem may correspond to the case where the functional unit is not operating properly because one or more internal operations are not completed within an expected time window.

As illustrated in FIG. 2, the monitoring system may include one or more voltage regulators 240 and one or more clock generators 250. The voltage regulator(s) may output supply voltage(s) to the functional units and the clock generator(s) 250 may output operating frequencies to the functional units. The functional units may be located along the same or different paths to be exercised, and thus monitored, by the state machine.

In one embodiment, the voltage regulator(s) 240, the clock generator(s) 250, and the CPU may be considered functional units subject to error testing and compensation by the instructions and routines of the state machine. Another functional unit may be a signal path, for example, between the CPU and the memory storing the instructions and routines implementing the state machine. As previously indicated, compensation performed by the state machine 210 may include, for example, changing the operating frequency, increasing the supply voltage, and/or forward body biasing one or more of the functional units. All of the features illustrated in FIG. 2 may be included on a same chip or one or more of the features may be located off-chip.

Figure 3:
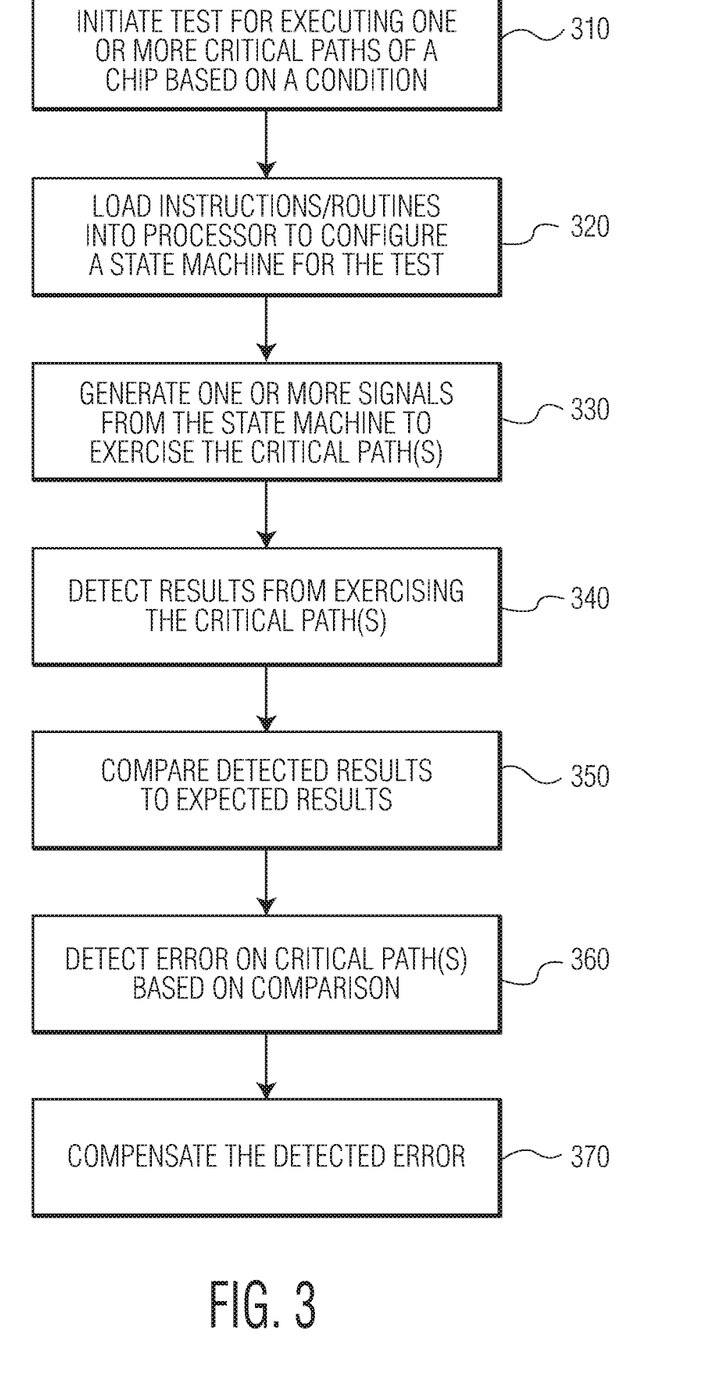
FIG. 3 illustrates an embodiment of a method for controlling operation of a chip.
Figure 4:
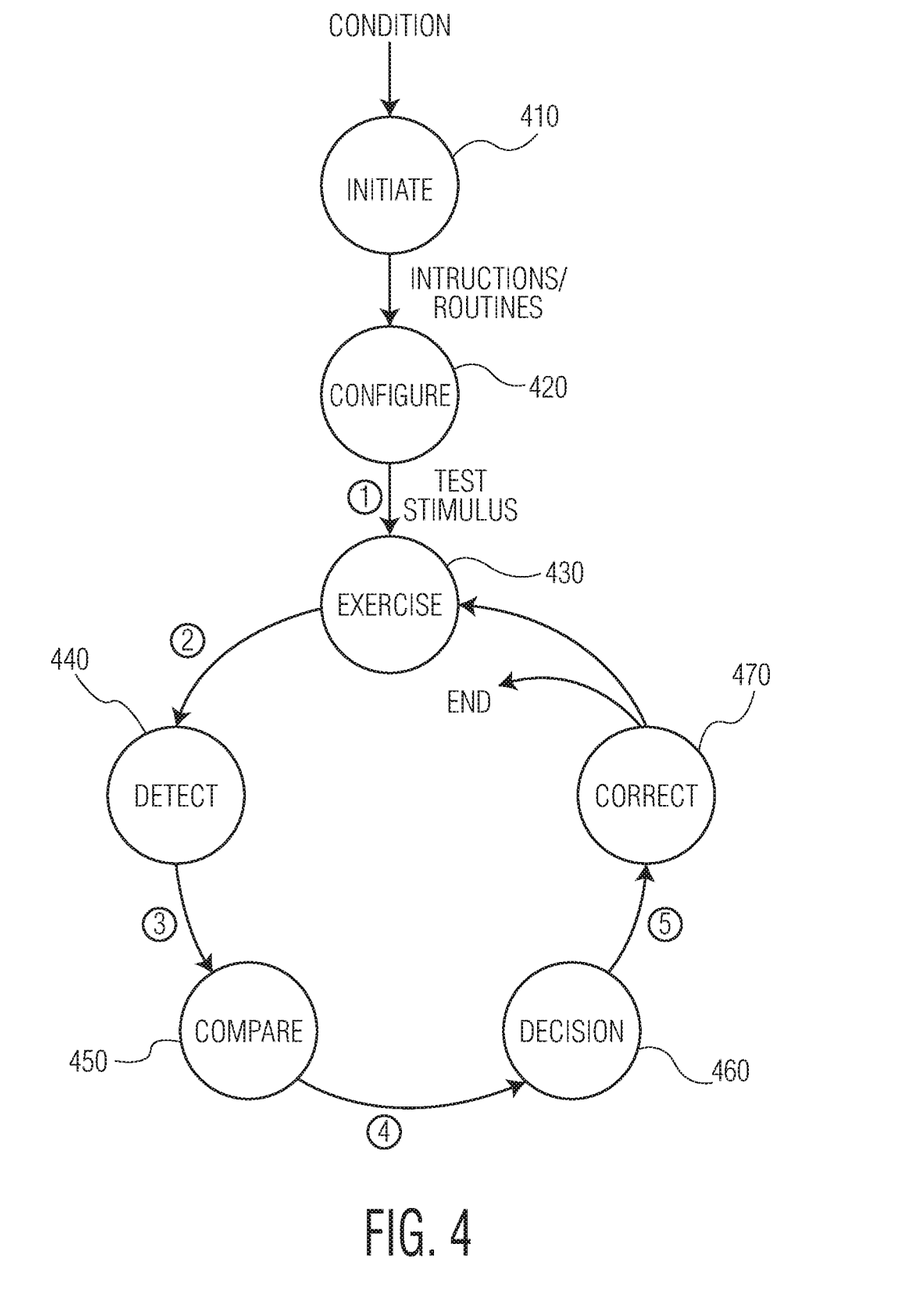
FIG. 4 illustrates an embodiment of a state diagram for controlling operation of a chip.

FIG. 3 illustrates an example of a method for monitoring the health of one or more electronic circuits, which, for example, may be included on a chip. FIG. 4 illustrates an example of a state diagram that may be implemented by a state machine in accordance with one or more embodiments, including the embodiment of FIG. 3.

In operation 310, the method includes initiating a test for exercising one or more signal paths of a chip based on a condition. The test may include determining the performance or operational state of at least one functional unit, as previously described. The signal paths may be exercised, for example, based on an applied frequency, signal, waveform, or other stimulus intended to generate a specific result that may be used as a basis for determining operation of the functional unit(s) and/or the overall chip. Operation 310 may correspond to the initiate state 410 in the state diagram.

The condition for initiating the test may be programmed into control software of a processor used to implement the state machine in accordance with one or more embodiments. The control software may correspond to the instructions or routines used to configure the processor as a state machine or may be stored as an application, firmware, or other control instructions executed by the processor. The condition may be determined, for example, based on a periodic or predetermined timing schedule, based on an operational state (e.g., idle time) of a functional unit (e.g., CPU or other processor), on a predetermined priority of tasks performed by the functional units, an anticipated condition (e.g., degradation) of the host system, chip, or circuit, or changes in one or more parameter (e.g., temperature, voltage, current, process variations, aging effects, etc.). In one embodiment, initiation of the test performed in operation 310 may be based on a combination of the aforementioned and/or other conditions.

In operation 320, instructions and/or routines may be retrieved from a memory to configure the processor as a state machine for performing the test for exercising the signal path(s). One of the signal paths may be a signal path used to fetch instructions from a memory. Other signal paths may include one or more functional units as illustrated, for example, in FIG. 2 or as otherwise described herein. In one embodiment, the instructions may configure the state machine to exercise paths inside of the processor and/or outside of the processor on the same chip. For example, in addition to exercising the path between the processor and memory to fetch instructions, the instructions (e.g., arithmetic instructions) themselves may exercise (signal) paths inside the processor. In one embodiment, the instructions may exercise paths outside of the processor performed based on load or store instructions. Operation 320 may correspond to the configure state 420 in FIG. 4.

In operation 330, the state machine generates one or more signals to exercise the signal path(s) to be tested. This may involve, for example, setting an operating frequency, voltage, or current of one or more functional units on the signal path and/or applying a signal or waveform or other stimulus to the path for the purpose of producing an intended response (indicative of the health of the path and/or chip). The parameters used by the state machine for this purpose may be programmed into the instructions or routines, along with the timing of when the state machine is to exercise the signal path(s) based on these parameters. Operation 330 may correspond to the exercise state 430 in FIG. 4. The transition between the configure and exercise states includes application of a test stimulus along path ① in the state diagram.

In operation 340, results from exercising the signal path(s) are detected. The results may be detected using at least one detector based on the type of performance being monitored on the signal path(s). For example, the at least one detector may detect the output data of one or more functional units in order to detect timing problems or other errors. In one embodiment, the at least one detector may detect various parameters indicative of timing problems and/or other errors that may adversely affect one of the functional circuits or overall performance of the chip. Examples of other types of results may include those discussed herein. In one embodiment, the at least one detector may include a temperature sensor, voltage sensor, and/or current sensor to measure values on the tested path(s). In one embodiment, the at least one detector may be omitted, and the processor configured as the state machine may directly receive the results. Operation 340 may correspond to the detect state 440 in FIG. 4. The transition to the detect state may occur along path ② in the state diagram.

In operation 350, the detected results are compared to expected results. The expected results may be, for example, parameters, values, or other information corresponding to a predetermined performance level or state of the signal path(s) being exercised. In one embodiment, the expected results may be indicative of a performance level or state of the signal path(s) when operating in one or more power or operational modes or when otherwise operating in a non-error condition. The power or operational modes may be a normal mode, low-power mode, or another type of mode depending, for example, on the intended operations of the chip. Operation 350 may correspond to the compare state 450 in FIG. 4. The transition to the compare state 450 may include transferring the detected results along path ③ in the state diagram. When the chip includes a detector, operation 350 and path ③ may include transferring results from the detector to the processor implementing the state machine.

In operation 360, an error in the signal path(s) that were exercised may be determined to exist when the comparison performed in operation 350 indicates that the detected results do not match the expected results. In one embodiment, the degree to which the detected results deviate from the expected results may, for example, provide an indication of the type of error that exists. In one embodiment, the expected results (which, for example, may be stored in memory or buffer) may be selected to indicate the specific type of error when there is a deviation. In one embodiment, the detected results may be stored in a predetermined register. In this case, the state machine may retrieve the value stored in the register and compare it to an expected value to determine the existence of an error. The transition to the decision state 460 may include transferring a result of the comparison performed in operation 350 along path ④ in the state diagram.

In operation 370, the state machine performs one or more operations for compensating the detected error. For example, the state machine may generate one or more control signals for setting or adjusting a parameter for controlling the operation of one of the functional units along the signal path(s) that was exercised. This may involve adjusting a maximum or operational frequency of the functional unit(s) and/or the overall chip, adjusting a supply or operating voltage of the functional unit(s) or chip, resolving a timing problem along the signal path(s), and/or performing one or more other corrective actions. In one embodiment, the control signals may compensate the error, for example, by mitigating or eliminating the effects caused by the error on the signal path(s). In one embodiment, the control signals may take preemptive action to prevent the occurrence of an anticipated error indicated to be imminent based on the comparison of the detected results to the expected results. The transition to the compensation (or correct) state 470 may include transferring a result of the comparison performed in operation 350 along path ⑤ in the state diagram. After compensation is performed, the state machine may exercise another signal path or the testing process may end until another condition is detected.

In accordance with one or more of the aforementioned embodiments, a health monitor includes a storage device configured to store instructions and a processor configured to operate as a state machine based on the stored instructions. The state machine may be configured to exercise a signal path in a chip in response to a condition and determine presence of an error in the signal path based on results from the exercise. The state machine may be configured to compensate for the error by changing at least one operational parameter of the chip. In accordance with one or more other embodiments, a method for monitoring the health of a chip is provided which, for example, may use a state machine as described above. In accordance with one or more other embodiments, a non-transitory machine-readable medium stores instructions for configuring a state machine as described above, which, for example, may perform the operations of the monitor and method embodiments described herein.

Through at least one of these embodiments, a software-driven monitor is provided which may determine the health of a chip by exercising one or more signal paths in the chip. The monitor may use a state machine to exercise the signal paths and compensate (or correct) errors. Using a state machine for this purpose allows errors to be compensated or corrected more flexibly and at lower cost compared to other hardware-based methods. Also, one or more embodiments described herein may be implemented without consuming additional space on the chip, does not require trimming, and allows testing of the signal paths to be changed at any time simply by updating or otherwise changing the instructions used to configure the state machine, which is beneficial especially after fabrication. One or more embodiments may also exercise an actual system, and hence may have better correlation to actual variability than indirect techniques.

Additionally, compared to a worst-case design, one or more embodiments described herein may offered better area, power, or performance (since all worst-case corner conditions will not always occur at the same time). Also, the embodiments described herein may measure and compensate for real aging effects, which may be difficult to predict due to difficulties in predicting operating conditions and recovery effects during the lifetime of the device using other techniques. In accordance with one or more embodiments, the processor may correspond to a separate processing or control circuit on the chip that is coupled to one or more of the functional units or may be one of the functional units.

Additionally, it is noted that the methods, processes, and/or operations described herein may be performed by code or instructions to be executed by a computer, processor, controller, or other signal processing device. The code or instructions may be stored in the non-transitory computer-readable medium as previously described in accordance with one or more embodiments. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The processors, functional units, detectors, and other signal generating or signal processing features of the embodiments disclosed herein may be implemented in logic which, for example, may include hardware, software, or both. When implemented at least partially in hardware, processors, functional units, detectors, and other signal generating or signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, functional units, detectors, and other signal generating or signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein. The term "device unit data" may be or include card unique data or other type of unique device-specific data.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A chip health monitor, comprising:
a storage device configured to store instructions; and
a processor configured to operate as a state machine based on the stored instructions,
wherein the state machine is configured to exercise at least one signal path in a chip in response to a condition and determine presence of an error in the at least one signal path based on results from the exercise, and
wherein the state machine is configured to compensate for the error by changing at least one operational parameter of the chip, and
wherein the state machine is configured to change an operation or parameter for exercising the at least one signal path when the instructions stored in the storage device change.

2. The chip health monitor of claim 1, wherein the condition includes detection of one or more anomalies in data values output from one or more functional blocks of the chip.

3. The chip health monitor of claim 1, wherein the state machine is configured to generate signals to exercise at least one signal path outside of the chip.

4. The chip health monitor of claim 1, wherein the condition includes at least one of detection of an idle time of a central processing unit of the chip or a periodic timing.

5. The chip health monitor of claim 1, wherein the error is one of a timing problem, a maximum operating frequency outside of a predetermined range, a supply voltage or current deviating from a predetermined voltage or current, a delay on a signal path, or an error producing by aging effects of the chip.

6. The chip health monitor of claim 1, wherein the at least one signal path is configured to transfer the instructions from the storage device to the processor.

7. The chip health monitor of claim 1, wherein
the at least one signal path is an internal signal path of the processor, and
the state machine is configured to exercise the internal signal path based on an instruction transferred from the storage device to the processor.

8. The chip health monitor of claim 1, wherein the at least one operational parameter of the chip includes maximum operating frequency of the chip, an operating frequency of a functional unit on the chip, a supply voltage of the chip, or a forward body bias of the chip.

9. The chip health monitor of claim 1, wherein the storage device and the processor are on the chip.

10. A method for monitoring the health of a chip, comprising:
detecting a condition;
configuring a processor to operate as a state machine for exercising at least one signal path in the chip, the processor configured to operate as the state machine based on stored instructions;
determining presence of an error based on results obtained from the state machine exercising the at least one signal path;
compensating for the error by changing at least one operational parameter of the chip; and
changing the stored instructions to change operation or a parameter of the state machine for exercising the at least one signal path.

11. The method of claim 10, wherein the condition includes detection of one or more anomalies in data values output from one or more functional blocks of the chip.

12. The method of claim 10, wherein the error is one of a timing problem, a maximum operating frequency outside of a predetermined range, a supply voltage or current deviating from a predetermined voltage or current, a delay on a signal path, or an error producing by aging effects of the chip.

13. The method of claim 10, wherein the signal path is configured to transfer the instructions from the storage device to the processor.

14. The method of claim 10, wherein:
the at least one signal path is an internal signal path of the processor, and
the state machine is configured to exercise the internal signal path based on an instruction transferred from the storage device to the processor.

15. A non-transitory machine-readable medium storing instructions for causing a processor to perform operations including:
detecting a condition;
configuring a processor to operate as a state machine for exercising at least one signal path in the chip, the processor configured to operate as the state machine based on stored instructions;
determining presence of an error based on results obtained from the state machine exercising the at least one signal path;
compensating for the error by changing at least one operational parameter of the chip; and
changing the stored instructions to change operation or a parameter of the state machine for exercising the at least one signal path.

16. The medium of claim 15, wherein the error is one of a timing problem, a maximum operating frequency outside of a predetermined range, a supply voltage or current deviating from a predetermined voltage or current, a delay on a signal path, or an error producing by aging effects of the chip.

17. The medium of claim 15, wherein:
the at least one signal path is an internal signal path of the processor, and
the state machine is configured to exercise the internal signal path based on an instruction transferred from the storage device to the processor.

* * * * *